United States Patent [19]

Ogawa

[11] Patent Number: 5,157,430

[45] Date of Patent: Oct. 20, 1992

[54] SUPPORTING APPARATUS OF OPTICAL ELEMENT

[75] Inventor: Yuzi Ogawa, Tokyo, Japan

[73] Assignee: Asahi Kogaku Kogyo Kabushiki Kaisha, Tokyo, Japan

[21] Appl. No.: 727,454

[22] Filed: Jul. 9, 1991

[30] Foreign Application Priority Data

Jul. 19, 1990 [JP] Japan .................................. 2-76782[U]

[51] Int. Cl.⁵ .............................................. G03B 13/02
[52] U.S. Cl. ...................................... 354/219; 359/811
[58] Field of Search ................................ 354/219-225; 359/811

[56] References Cited

U.S. PATENT DOCUMENTS 4,100,555 7/1978 Johnson .......................... 354/219 X
4,545,655 10/1985 Fantone et al. ................. 354/225 X Primary Examiner—Russell E. Adams
Assistant Examiner—David M. Gray
Attorney, Agent, or Firm—Sandler, Greenblum & Bernstein

[57] ABSTRACT

A supporting apparatus for an optical element includes a supporting frame which is adapted to support the optical element. The optical element is provided with at least one elastic engaging portion integral therewith. The supporting frame is provided with an engaging portion in which the elastic engaging portion of the optical element can be elastically engaged.

12 Claims, 1 Drawing Sheet

SUPPORTING APPARATUS OF OPTICAL ELEMENT

BACKGROUND OF THE INVENTION

1. Field of the Invention

The present invention relates to a supporting apparatus which supports an optical element.

2. Description of Related Art

View finders are known in which a field of view can be varied in accordance with an autofocus (AF) mechanism having a stationary lens group secured to a camera body and a movable variable power lens group which is slidably supported by the camera body.

A lens of the stationary lens group is supported by a stationary lens supporting frame which can be secured to the camera body. On the other hand, a lens of the movable variable power lens group is supported by a movable lens supporting frame which can be slidably supported by the camera body.

In a known view finder, special lens supporting springs are fitted on the associated lenses mounted to the respective lens supporting frames so that the lenses of the lens groups are supported by the respective lens supporting frames with the help of the elasticity of the lens supporting springs, the lenses being fitted without play between the lenses and the associated lens supporting frames. Consequently, lens supporting springs in an order corresponding to the number of lenses to be attached to the respective lens supporting frames must be prepared, with a large number of components, thereby resulting in a complex assembly and an increase in manufacturing cost.

SUMMARY OF THE INVENTION

The primary object of the present invention is to provide a simple supporting apparatus for an optical element which requires fewer components and can be more easily assembled than can the prior art.

The basic concept of the present invention resides in the integral formation of the supporting spring and the associated optical element, unlike the prior art in which supporting springs separate from the optical element are needed.

To achieve the objects mentioned above, according to the present invention, a supporting apparatus for an optical element is provided which comprises a supporting frame which supports the optical element. The optical element is provided with an elastic engaging portion integral therewith. The supporting frame is provided with an engaging portion in which the elastic engaging portion of the optical element can be elastically engaged.

In this arrangement, there is no supporting member separate from the optical element, and, accordingly, the number of components of the supporting apparatus is reduced, resulting in a simplified assembly thereof.

When the optical element is a lens made of synthetic resin, the lens and the auxiliary parts of the lens can be integrally molded with ease. For example, these peripheral parts could be supporting plates extending horizontally from the right and the left sides of the lens; or elastically deformable arms which vertically (upwardly and downwardly) extend and which are rearwardly bent from the supporting plates in the optical axis direction. Furthermore, the elastically deformable arms constitute the elastic engaging portions. The elasticity of the deformable arms provides the lens engaging supports with sufficient elastic force as these arms are bent in both the upward and downward directions. Then, the lens is secured in the lens engaging supports by the elastic force of the deformable arms.

Moreover, when the lens engaging supports are lens engaging grooves located in the vertically protruded parts of the supporting frame, the following advantages are obtained: when the deformable arms are inserted in the lens engaging grooves, the lens can be easily adjusted by pulling up the lugs disposed at both the right and the left horizontal ends of the supporting plate.

The present disclosure relates to the subject matter contained in Japanese utility model application No. 2-76782 (filed on Jul. 19, 1990), which is expressly incorporated herein by reference in its entirety.

BRIEF DESCRIPTION OF THE DRAWING

The invention will be described below in detail with reference to FIG. 1 of the accompanying drawing, which shows an exploded perspective view of a supporting apparatus for an optical element of a camera, according to the present invention.

DESCRIPTION OF THE PREFERRED EMBODIMENTS

Figure 1:
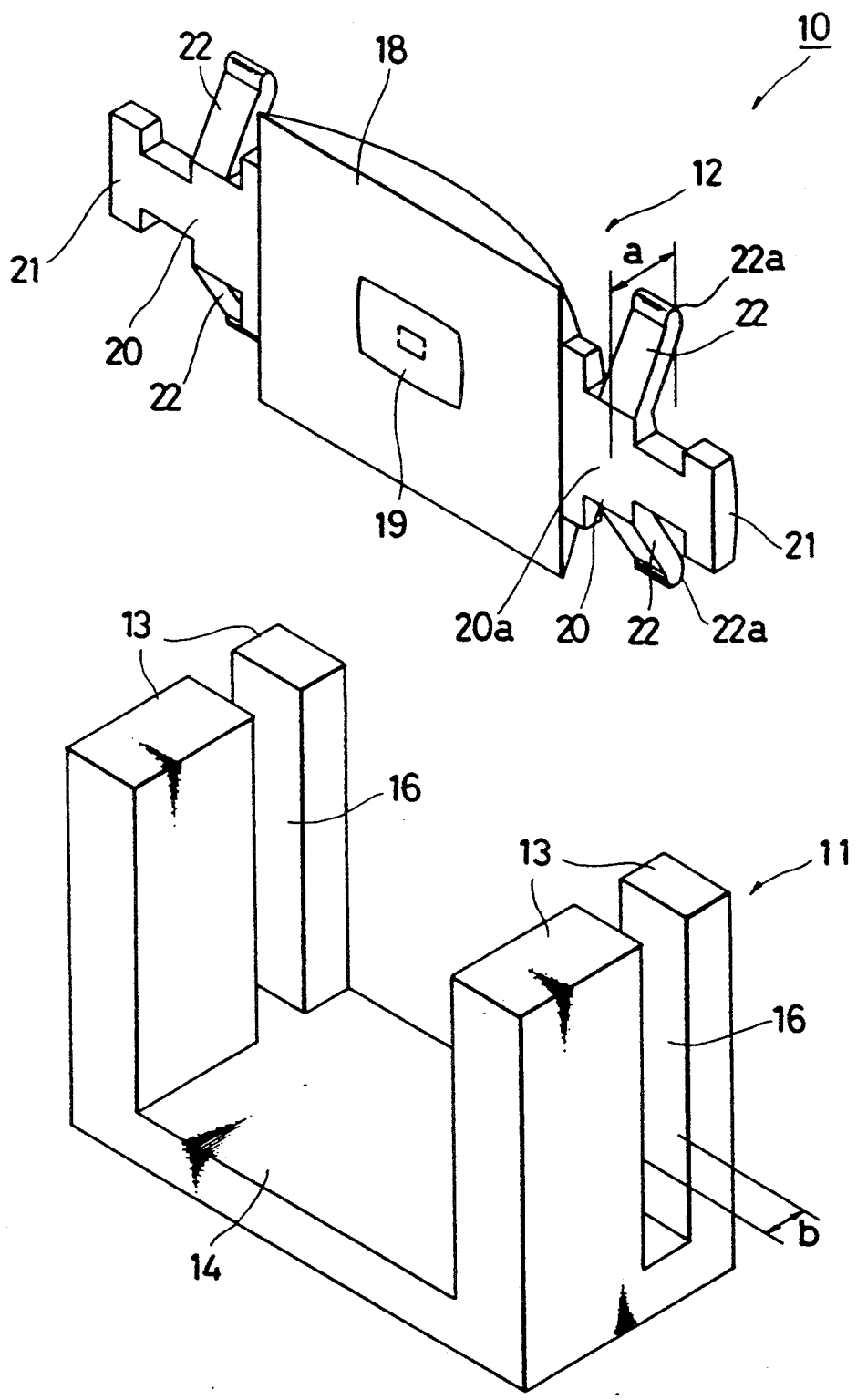

FIG. 1 generically shows a supporting apparatus for an optical element, embodied as a lens supporting assembly 10 provided on a view finder Of a camera.

The lens supporting assembly 10 includes a lens supporting frame 11 which is adapted to support a lens of a stationary lens group or a movable lens group used in an optical system, such as a camera, and a synthetic resin lens (plastic lens) 12 which constitutes an optical element to be supported by the lens supporting frame 11.

The lens supporting frame 11 is provided at its central portion with a planar portion (plate) 14 and end projections 13 integral therewith, located at opposite ends of the planar portion 14. The projections 13 extend upwardly from the plane of the planar portion 14 and are provided with lens engaging grooves (lens engaging supports) 16 of predetermined width which have open upper ends. The lens engaging grooves 16 extend upwardly from the plane of the planar portion 14.

The synthetic resin lens 12, which is made of acrylic resin or the like, has a lens portion 18 which is provided on its central portion with an object distance measuring frame 19 of a view finder evaporated thereon, and supporting plates 20 which are formed integral with the lens portion 18 and which project in lateral directions from the lens portion 18.

The right and left supporting plates 20 have elastically deformable arms (elastic engaging portions) 22 corresponding to the associated lens engaging grooves 16 of the lens supporting frame 11. The elastically deformable arms 22 are inclined at a predetermined angle with respect to the plane of the lens portion 18. Namely, in FIG. 1, there are two pairs of right and left elastically deformable arms 22 which are bent rearwardly as viewed in the optical axis direction of the lens portion 18. The width "a" of each elastically deformable arm 22, in a free state, from the front side surface 20a of the associated supporting plate 20 to the front end (upper end or lower end) 22a of the elastically deformable arm 22, is larger than the width "b" of each lens engaging groove 16. The elastically deformable arms 22 of synthetic resin, such as acrylic resin, are elastically deformed in the optical axis direction when the elastically deformable arms 22 are fitted into the corresponding lens engaging grooves 16 of the supporting frame 11, so that the front ends 22a thereof are elastically deflected. The elastically deformable arms 22 can be bent forwardly in the optical axis direction. In that case, the same effects can be obtained as with the rearwardly bent arms.

The right and left supporting plates 20 have lugs 21 at the right and left ends (outer ends) thereof. The lugs 21 project outwardly from the lens supporting frame 11 in both rightward and leftward directions when the elastically deformable arms 22 are fitted in the corresponding lens engaging grooves 16, respectively.

The lens supporting assembly 10 can be easily manufactured as an integral body in which the synthetic resin lens is formed together with the supporting plates 20, the lugs 21 and the elastically deformable arms 22.

When the synthetic resin lens 12 is attached to the lens supporting frame 11, the right and left elastically deformable arms 22 are fitted into corresponding lens engaging grooves 16 so that the lugs 21 project outwardly from the lens supporting frame 11 in the rightward and leftward directions, as mentioned above. Thereafter, the synthetic resin lens 12 is wholly pressed down. As a result, the elastically deformable arms 22 are elastically deformed or deflected within the associated lens engaging grooves 16 of the lens supporting frame 11 so that the synthetic resin lens 12 can be firmly held in the associated lens engaging grooves 16 with an elastic force acting on the inner wall surfaces of the lens engaging grooves 16 through the front side faces 20a of the supporting plates 20, and the front ends 22a of the elastically deformable arms 22. Namely, the plastic lens 12 can be held by the lens supporting frame 11 so as not to accidentally come out of the lens engaging grooves 16.

The object distance measuring frame 19 of the lens portion 18 can be made coincident with an automatic object distance measuring position by adjusting the position of the synthetic resin lens 12. During adjustment of the plastic lens 12, the lugs 21 of the supporting plates 20, projecting outwardly from the lens supporting frame 11 in the right and left directions, are held by operator's fingers to slide the whole plastic lens 12 upwardly and downwardly. After adjustment, the elastically deformable arms 22 are adhered to the associated lens engaging grooves 16 by an adhesive or the like. Although the supporting device of the present invention is applied to a lens supporting assembly 10 in the illustrated embodiment, the invention can equally well be applied to a supporting apparatus of optical reflecting member, such as mirror.

As can be seen from the above discussion, according to the present invention, since an optical element can be firmly held by a supporting frame without special supporting springs or the like, the assembly can be simplified, resulting in an increased efficiency of operation. Furthermore, due to a reduction in the number of components, the manufacturing cost can be reduced.

Although the invention has been described with reference to particular means, materials, and embodiments, it is to be understood that the invention is not limited to the particulars disclosed and extends to all equivalents within the scope of the claims.

I claim:

1. A supporting apparatus for an optical element comprising elastic engaging portions of said optical element and a supporting frame which is adapted to support the optical element, said optical element being formed from a synthetic resin, each said elastic engaging portion being integral with said optical element, said supporting frame being provided with at least one receiving engaging portion in which each said elastic engaging portion of the optical element can be elastically engaged, wherein said elastic engaging portions include supporting plates protruding from at least two sides of said optical element and elastically deformable arms being inclined along an optical axis of said optical element.

2. A supporting apparatus according to claim 1, wherein said optical element is a lens to which said elastic engaging portions is integrally connected.

3. A supporting apparatus according to claim 2, wherein said lens further comprises:
   a lens portion;
   said supporting plates protruding both rightwardly and leftwardly from the lens portion; and
   each said elastically deformable arm extending both upwardly and downwardly, each said elastically deformable arm being included either forwardly or rearwardly along the optical axis.

4. A supporting apparatus according to claim 3, wherein said at least one receiving engaging portion comprises generally vertical grooves formed on opposite sides of the supporting frame.

5. A supporting apparatus according to claim 4, wherein each of said supporting plates has a lug formed thereon, said lugs protruding from respective sides of said supporting frame when the elastically deformable arms are inserted in said grooves.

6. A supporting apparatus according to claim 5, wherein the distance between front and rear surfaces of each deformable arm, in a free state, is greater than the width of each of said grooves.

7. A supporting apparatus according to claim 4, wherein said at least one receiving engaging portion of the supporting frame comprises engaging grooves into which corresponding elastically deformable arms can be elastically fitted.

8. A supporting apparatus according to claim 7, wherein said supporting frame comprises a planar plate portion and a pair of projections extending therefrom, said engaging grooves being located in respective ones of said projections.

9. A supporting apparatus according to claim 2, wherein said lens is a lens of a stationary lens group of a camera.

10. A supporting apparatus according to claim 2, wherein said lens is a lens of a movable lens group of a camera.

11. A supporting apparatus according to claim 7, wherein said elastically deformable arms are inclined along the optical axis direction of the optical element, with respect to a plane in which the supporting frame is positioned, so that the elastically deformable arms are elastically deformed when they are fitted into respective engaging grooves of the supporting frame.

12. A supporting apparatus according to claim 11, wherein the width of each of the elastically deformable arms, defined by the distance from the base ends to the front end thereof, is greater than the width of a respective engaging groove of the supporting frame.

* * * * *

UNITED STATES PATENT AND TRADEMARK OFFICE
CERTIFICATE OF CORRECTION

PATENT NO. : 5,157,430
DATED : October 20, 1992
INVENTOR(S) : Yuzi Ogawa

It is certified that error appears in the above-indentified patent and that said Letters Patent is hereby corrected as shown below:

Column 4, line 23, change "included" to --inclined--.

Signed and Sealed this

Fifth Day of April, 1994

*Attest:*

BRUCE LEHMAN

*Attesting Officer*        *Commissioner of Patents and Trademarks*